US012515737B2

(12) United States Patent
Nakamura

(10) Patent No.: US 12,515,737 B2
(45) Date of Patent: Jan. 6, 2026

(54) GRIP DETERMINING SYSTEM

(71) Applicant: HONDA MOTOR CO., LTD., Tokyo (JP)

(72) Inventor: Kotaro Nakamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 48 days.

(21) Appl. No.: 18/584,142

(22) Filed: Feb. 22, 2024

(65) Prior Publication Data
US 2024/0326906 A1    Oct. 3, 2024

(30) Foreign Application Priority Data

Mar. 27, 2023    (CN) .......................... 202310307952.7

(51) Int. Cl.
*B62D 6/10*    (2006.01)
*B60W 60/00*    (2020.01)
(Continued)

(52) U.S. Cl.
CPC ........... *B62D 6/10* (2013.01); *B60W 60/0053* (2020.02); *B62D 1/046* (2013.01); *B62D 6/007* (2013.01);
(Continued)

(58) Field of Classification Search
CPC .......... B62D 6/10; B62D 1/046; B62D 6/007; B62D 1/286; B60W 60/0053;
(Continued)

(56) References Cited

U.S. PATENT DOCUMENTS 11,249,476 B2    2/2022 Kuwabara et al.
2015/0360567 A1*   12/2015 Sannomiya ............ B60K 35/00
345/174
(Continued)

FOREIGN PATENT DOCUMENTS

JP    2020082821 A    6/2020
KR    100976701 B1 *  8/2010 ............... B62D 6/10

OTHER PUBLICATIONS

Machine Translation of KR 100976701 B1 PDF File Name: "KR100976701B1_Machine_Translation.pdf" (Year: 2010).*

*Primary Examiner* — Grant Moubry
*Assistant Examiner* — Ruben Picon-Feliciano
(74) *Attorney, Agent, or Firm* — Armstrong Teasdale LLP

(57) ABSTRACT

A grip determining system includes a contact sensor provided in a steering operation member of a vehicle and configured such that capacitance of the contact sensor varies according to a contact position of a driver on the steering operation member, a steering torque sensor configured to output an output value according to steering torque generated by a steering operation by the driver, and a controller configured to determine whether the driver is gripping the steering operation member. The controller is configured to estimate the contact position of the driver on the steering operation member based on the capacitance of the contact sensor, set a threshold according to the estimated contact position of the driver, and determine that the driver is gripping the steering operation member in a case where the output value of the steering torque sensor is equal to or more than the threshold.

7 Claims, 11 Drawing Sheets

(51) Int. Cl.
  *B62D 1/04*    (2006.01)
  *B62D 6/00*    (2006.01)
(52) U.S. Cl.
  CPC ... *B60W 2420/24* (2013.01); *B60W 2510/202* (2013.01); *B60W 2540/223* (2020.02)
(58) Field of Classification Search
  CPC ....... B60W 2420/24; B60W 2510/202; B60W 2540/223; B60W 40/09; B60W 40/00; B60W 50/00
  See application file for complete search history.

(56) References Cited

U.S. PATENT DOCUMENTS

2017/0351256 A1* 12/2017 Kumakiri .......... B60W 60/0053
2019/0023310 A1*  1/2019 Odate .................... G01D 5/241
2022/0024462 A1*  1/2022 Sekine ............. B60W 60/0053
2024/0182104 A1*  6/2024 Yamazaki ................ B62D 1/06
2024/0328832 A1* 10/2024 Horie ....................... B62D 1/04

* cited by examiner

GRIP DETERMINING SYSTEM

TECHNICAL FIELD

The present invention relates to a grip determining system for determining whether a driver of a vehicle is gripping a steering operation member.

BACKGROUND ART

In recent years, there has been an increase in efforts to give consideration to vulnerable people among transport participants and provide them with access to sustainable transport systems. To this end, research and development to further improve traffic safety and convenience through the development of active safety technologies is attracting attention.

Especially, as the development of active safety technologies, the development of a grip determining system for determining whether a driver of a vehicle is gripping a steering operation member (for example, a steering wheel) is attracting attention. For example, a known grip determining system determines that a driver is gripping a steering operation member in a case where an output value of a steering torque sensor is equal to or more than a threshold (see JP2020-82821A).

The output value of the steering torque sensor varies according to the contact position of the driver on the steering operation member. In the conventional technique, the threshold is not set in consideration of the contact position of the driver on the steering operation member while the threshold is set according to whether the driver is in contact with the steering operation member. Accordingly, in a case where the threshold is set to a relatively small value, it may be wrongly determined that the driver is gripping the steering operation member even though the driver is not gripping the steering operation member in a portion of the steering operation member where the output value of the steering torque sensor is likely to be large. By contrast, in a case where the threshold is set to a relatively large value, it may be wrongly determined that the driver is not gripping the steering operation member even though the driver is gripping the steering operation member in a portion of the steering operation member where the output value of the steering torque sensor is likely to be small. Thus, in the conventional technique, it is difficult to accurately determine whether the driver is gripping the steering operation member according to the contact position of the driver on the steering operation member.

SUMMARY OF THE INVENTION

In view of the above background, an object of the present invention is to accurately determine whether a driver is gripping a steering operation member according to a contact position of the driver on a steering operation member, and to contribute to the development of a sustainable transportation system accordingly.

To achieve such an object, one aspect of the present invention provides a grip determining system (3), comprising: a contact sensor (35) provided in a steering operation member (22) of a vehicle (1) and configured such that capacitance of the contact sensor varies according to a contact position of a driver on the steering operation member; a steering torque sensor (32) configured to output an output value according to steering torque generated by a steering operation by the driver on the steering operation member; and a controller (15) configured to determine whether the driver is gripping the steering operation member based on the capacitance of the contact sensor and the output value of the steering torque sensor, wherein the controller is configured to estimate the contact position of the driver on the steering operation member based on the capacitance of the contact sensor, set a threshold according to the estimated contact position of the driver, and determine that the driver is gripping the steering operation member in a case where the output value of the steering torque sensor is equal to or more than the threshold.

According to this aspect, it is possible to set the threshold to an appropriate value according to the contact position of the driver on the steering operation member. Accordingly, it is possible to accurately determine whether the driver is gripping the steering operation member. Accordingly, it is possible to contribute to the development of a sustainable transportation system.

In the above aspect, preferably, the steering torque sensor is configured such that the output value of the steering torque sensor becomes larger in a case where the driver is gripping a first portion of the steering operation member than in a case where the driver is gripping a second portion of the steering operation member, and the controller is configured to set the threshold to a larger value in a case where the controller estimates that the contact position of the driver on the steering operation member is the first portion of the steering operation member than in a case where the controller estimates that the contact position of the driver on the steering operation member is the second portion of the steering operation member.

According to this aspect, it is possible to set the threshold to an appropriate value according to whether the contact position of the driver on the steering operation member is the first portion (the portion where the output value of the steering torque sensor is likely to be large) or the second portion (the portion where the output value of the steering torque sensor is likely to be small).

In the above aspect, preferably, the steering torque sensor is configured such that the output value of the steering torque sensor becomes larger in a case where the driver is gripping an upper portion as the first portion of the steering operation member than in a case where the driver is gripping a lower portion as the second portion of the steering operation member, and the controller is configured to set the threshold to a larger value in a case where the controller estimates that the contact position of the driver on the steering operation member is the upper portion of the steering operation member than in a case where the controller estimates that the contact position of the driver on the steering operation member is the lower portion of the steering operation member.

According to this aspect, it is possible to set the threshold to an appropriate value according to whether the contact position of the driver on the steering operation member is the upper portion (the portion where the output value of the steering torque sensor is likely to be large) of the steering operation member or the lower portion (the portion where the output value of the steering torque sensor is likely to be small) of the steering operation member.

In the above aspect, preferably, the vehicle includes a steering device (7) configured to turn wheels (17), the steering torque sensor includes: a rotor (71) connected to the steering operation member and configured to rotate around a rotation axis; a sleeve (72) connected to the steering device and arranged around the rotor; and a torsion bar (73) connecting the rotor and the sleeve, and the rotor is offset more largely from the sleeve in a direction perpendicular to the rotation axis and thus the output value of the steering torque sensor becomes larger in a case where the driver is gripping the upper portion of the steering operation member than in a case where the driver is gripping the lower portion of the steering operation member.

According to this aspect, it is possible to set the threshold to an appropriate value according to the structural characteristics of the steering torque sensor.

In the above aspect, preferably, the controller is configured to set the threshold to a first value in a case where the controller estimates that the contact position of the driver on the steering operation member is the first portion of the steering operation member, set the threshold to a second value that is smaller than the first value in a case where the controller estimates that the contact position of the driver on the steering operation member is the second portion of the steering operation member, and set the threshold to a third value that is smaller than the first value and larger than the second value in a case where the controller estimates that the contact position of the driver on the steering operation member is a third portion between the first portion and the second portion of the steering operation member.

According to this aspect, it is possible to set the threshold more precisely according to the contact position of the driver on the steering operation member. Accordingly, it is possible to more accurately determine whether the driver is gripping the steering operation member.

In the above aspect, preferably, the controller is configured to execute autonomous driving control of the vehicle, set the threshold according to the contact position of the driver in a case where a stop condition to stop the autonomous driving control is satisfied while the autonomous driving control is being executed, and determine that the driver is gripping the steering operation member and transfer driving authority of the vehicle to the driver in a case where the output value of the steering torque sensor is equal to or more than the threshold.

According to this aspect, it is possible to transfer the driving authority of the vehicle to the driver after accurately determining that the driver is gripping the steering operation member. Accordingly, it is possible to prevent the driving authority of the vehicle from being transferred to the driver in a state where the driver does not grip the steering operation member sufficiently (for example, in a state where an object, such as a wet towel, other than the driver's hand is put on the steering operation member or in a state where only a few fingers of the driver are put on the steering operation member).

In the above aspect, preferably, the contact sensor includes a plurality of capacitive sensors (53 to 58), and in a case where the plurality of capacitive sensors includes a normal capacitive sensor and a failed capacitive sensor, the controller is configured to estimate the contact position of the driver on the steering operation member based on capacitance of the normal capacitive sensor, set the threshold according to the estimated contact position of the driver, and determine that the driver is gripping the steering operation member in a case where the output value of the steering torque sensor is equal to or more than the threshold.

According to this aspect, even in a case where some of the plurality of capacitive sensors are failed, it is possible to determine whether the driver is gripping the steering operation member by using both the capacitance of the normal capacitive sensor and the output value of the steering torque sensor.

In the above aspect, preferably, the contact sensor includes a plurality of capacitive sensors (53 to 58), and in a case where the plurality of capacitive sensors includes a normal capacitive sensor and a failed capacitive sensor and the controller cannot estimate the contact position of the driver on the steering operation member based on capacitance of the normal capacitive sensor, the controller is configured to estimate that the contact position of the driver on the steering operation member is a portion of the steering operation member that corresponds to the failed capacitive sensor, set the threshold according to the estimated contact position of the driver, and determine that the driver is gripping the steering operation member in a case where the output value of the steering torque sensor is equal to or more than the threshold.

According to this aspect, even in a case where some of the plurality of capacitive sensors are failed and the contact position of the driver on the steering operation member cannot be estimated based on the capacitance of the normal capacitive sensor, it is possible to determine whether the driver is gripping the steering operation member by using the output value of the steering torque sensor.

Effect of the Invention

Thus, according to the above aspects, it is possible to accurately determine whether a driver is gripping a steering operation member according to a contact position of the driver on a steering operation member.

BRIEF DESCRIPTION OF THE DRAWING(S)

DETAILED DESCRIPTION OF THE INVENTION

The First Embodiment

Hereinafter, the first embodiment of the present invention will be described with reference to FIGS. 1 to 6.

<The Vehicle 1>

Figure 1:
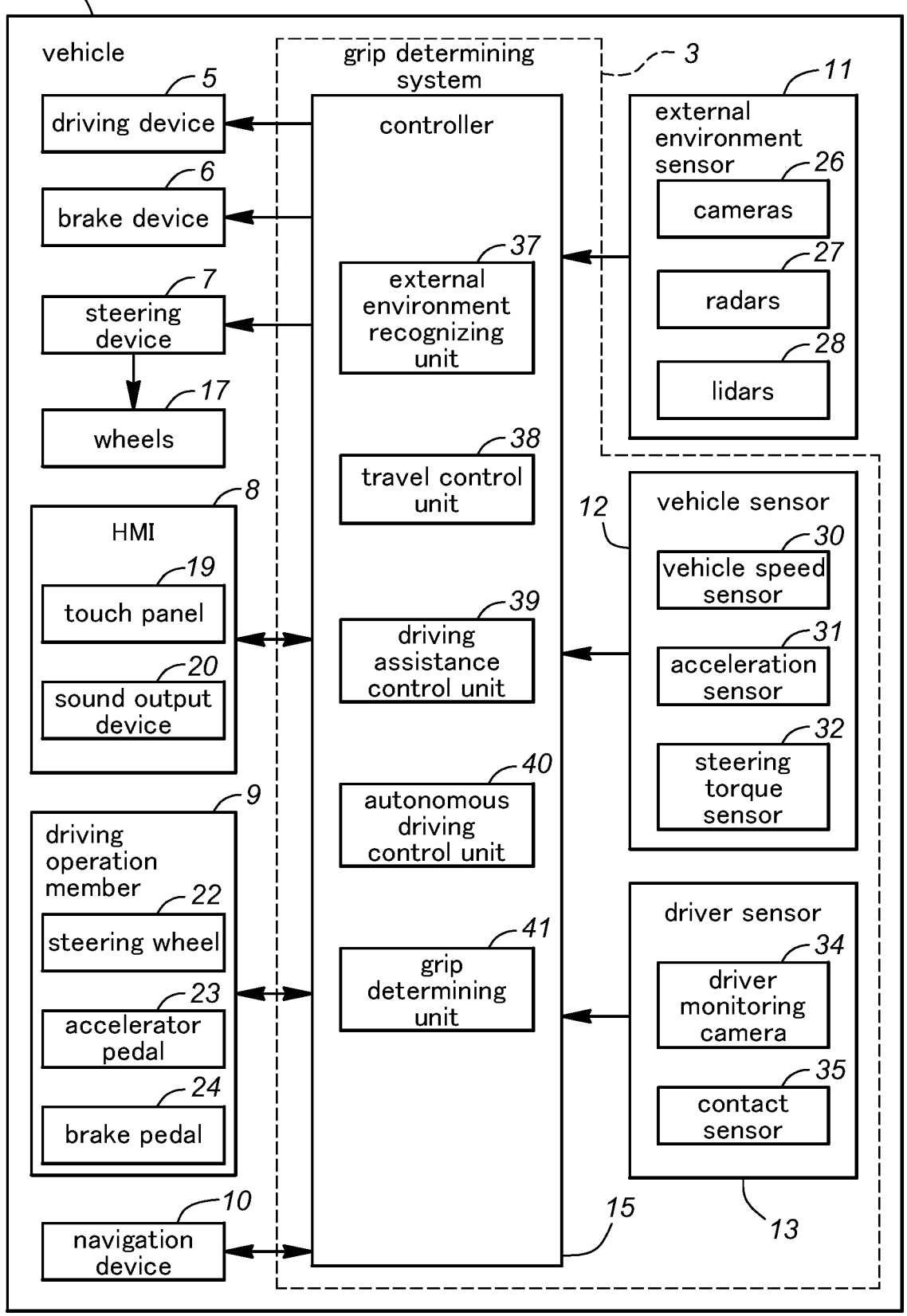
FIG. 1 is a functional block diagram showing a vehicle to which a grip determining system according to a first embodiment of the present invention is applied.

First, with reference to FIG. 1, a vehicle 1 to which a grip determining system 3 according to the first embodiment of the present invention is applied will be described. For example, the vehicle 1 is an automobile. In another embodiment, the vehicle 1 may be a vehicle (for example, a motorcycle) other than an automobile.

The vehicle 1 includes a driving device 5, a brake device 6, a steering device 7, a Human Machine Interface 8 (HMI), a driving operation member 9, a navigation device 10, an external environment sensor 11, a vehicle sensor 12, a driver sensor 13, and a controller 15. Hereinafter, the components of the vehicle 1 will be described in order.

The driving device 5 is a device that applies a driving force to the vehicle 1. The driving device 5 includes a drive source that generates a driving force for driving the vehicle 1. For example, the drive source is configured by an internal combustion engine and/or an electric motor.

The brake device 6 is a device that applies a braking force to the vehicle 1. For example, the brake device 6 includes a brake caliper that presses a pad against a brake rotor, and an electric cylinder that supplies hydraulic pressure to the brake caliper.

The steering device 7 is a device that changes a turning angle of wheels 17 by turning the wheels 17. For example, the steering device 7 includes a rack and pinion mechanism connected to the wheels 17 and an electric motor that drives the rack and pinion mechanism.

The HMI 8 is a device that presents information to an occupant (for example, the driver) of the vehicle 1 and receives information input by the occupant. The HMI 8 includes a touch panel 19 and a sound output device 20. The touch panel 19 displays various screens to the occupant and receives input operations on the various screens by the occupant. The sound output device 20 outputs audio guidance, warning sounds, or the like.

The driving operation member 9 is a device that receives a driving operation by the driver. The driving operation member 9 includes a steering wheel 22 (an example of a steering operation member) that receives the steering operation of the vehicle 1 by the driver, an accelerator pedal 23 that receives an acceleration operation of the vehicle 1 by the driver, and a brake pedal 24 that receives a brake operation of the vehicle 1 by the driver. Details of the steering wheel 22 will be described later.

The navigation device 10 is a device that provides route guidance to the destination of the vehicle 1. The navigation device 10 identifies the current position of the vehicle 1 based on GNSS signals received from artificial satellites. The navigation device 10 sets a route to the destination of the vehicle 1 based on the current position of the vehicle 1 and the destination of the vehicle 1 input into the touch panel 19 by the occupant.

The external environment sensor 11 is a device that detects the state of the external environment of the vehicle 1. The external environment sensor 11 includes a plurality of cameras 26, a plurality of radars 27, and a plurality of lidars 28 (LiDAR). Each camera 26 captures an image of a target (surrounding vehicles such as a preceding vehicle, pedestrians, structures on a road, lane markings, or the like) existing around the vehicle 1. Each radar 27 detects the position of the target existing around the vehicle 1 by emitting radio waves such as millimeter waves around the vehicle 1 and capturing the reflected waves thereof. Each lidar 28 detects the position of the target existing around the vehicle 1 by irradiating light such as infrared rays around the vehicle 1 and capturing the reflected light thereof.

The vehicle sensor 12 is a sensor that detects various vehicle states. The vehicle sensor 12 includes a vehicle speed sensor 30 that detects the vehicle speed of the vehicle 1, an acceleration sensor 31 that detects the acceleration (lateral acceleration) of the vehicle 1 in the lateral direction, and a steering torque sensor 32 that detects the steering torque generated in response to the steering operation of the vehicle 1 by the driver.

The driver sensor 13 is a device that detects the state of the driver. The driver sensor 13 includes a driver monitoring camera 34 and a contact sensor 35. The driver monitoring camera 34 captures an image of the driver. The contact sensor 35 is provided in the steering wheel 22 and detects a contact position of the driver on the steering wheel 22 based on capacitance. Details of the contact sensor 35 will be described later.

The controller 15 constitutes the grip determining system 3 together with the vehicle sensor 12 (more specifically, the steering torque sensor 32) and the driver sensor 13 (more specifically, the contact sensor 35).

The controller 15 is an electronic control unit (ECU) consisting of a computer configured to perform various processes. The controller 15 includes an arithmetic processing unit (a processor such as CPU and MPU) and a storage device (memory such as ROM and RAM). The arithmetic processing unit reads necessary software from the storage device and executes prescribed arithmetic processing according to the read software. The controller 15 may be configured as one piece of hardware, or may be configured as a unit consisting of plural pieces of hardware. The controller 15 is connected to each component of the vehicle 1 via a communication network such as Controller Area Network (CAN), and controls each component of the vehicle 1.

The controller 15 includes, as functional components, an external environment recognizing unit 37, a travel control unit 38, a driving assistance control unit 39, an autonomous driving control unit 40, and a grip determining unit 41. At least some of the functional components of the controller 15 may be realized by hardware such as LSI, ASIC, and FPGA, or may be realized by a combination of software and hardware.

The external environment recognizing unit 37 recognizes the state of the external environment of the vehicle 1 based on the detection result of the external environment sensor 11. For example, the external environment recognizing unit 37 recognizes the target (surrounding vehicles such as a preceding vehicle, pedestrians, structures on a road, lane markings, or the like) existing around the vehicle 1 based on the detection result of the external environment sensor 11.

The travel control unit 38 controls the traveling of the vehicle 1 according to the driving operation on the driving operation member 9 by the driver. For example, the travel control unit 38 controls the steering device 7 to turn the vehicle 1 in response to the steering operation of the vehicle 1 on the steering wheel 22 by the driver. The travel control unit 38 controls the driving device 5 according to the acceleration operation of the vehicle 1 on the accelerator pedal 23 by the driver, and accelerates the vehicle 1. The travel control unit 38 controls the brake device 6 in response to the brake operation of the vehicle 1 on the brake pedal 24 by the driver, and decelerates the vehicle 1.

The driving assistance control unit 39 executes advanced driving assistance control (Advanced Driver Assistance Systems: ADAS) of the vehicle 1 based on the recognition result of the external environment recognizing unit 37. The advanced driving assistance control is the control equivalent to autonomous driving levels 1 to 2 of SAE. When the advanced driving assistance control is executed, the driver becomes the driving entity of the vehicle 1 and has the driving authority of the vehicle 1. Hereinafter, the advanced driving assistance control will be abbreviated as "driving assistance control".

The driving assistance control unit 39 is configured to execute following travel control (adaptive cruise control: ACC) as the driving assistance control. When executing ACC, the driving assistance control unit 39 controls the driving device 5 and the brake device 6 to cause the vehicle 1 to follow the preceding vehicle while maintaining a prescribed inter-vehicle distance.

The driving assistance control unit 39 is configured to execute lane keeping assistance control (Lane Keeping Assistance System: LKAS) as the driving assistance control. When executing LKAS, the driving assistance control unit 39 controls the steering wheel 22 and the steering device 7 to assist the steering operation of the vehicle 1 by the driver such that the vehicle 1 maintains the traveling position within a lane.

The driving assistance control unit 39 is configured to execute collision mitigation brake control (Collision Mitigation Brake System: CMBS) as the driving assistance control. When executing CMBS, the driving assistance control unit 39 controls the brake device 6 to mitigate the collision between the vehicle 1 and an object outside the vehicle.

The autonomous driving control unit 40 executes autonomous driving control (Autonomous Driving: AD) of the vehicle 1. The autonomous driving control is the control equivalent to autonomous driving level 3 or higher of SAE. When the autonomous driving control is executed, the autonomous driving control unit 40 becomes the driving entity of the vehicle 1 and has the driving authority of the vehicle 1. When executing autonomous driving control, the autonomous driving control unit 40 automatically controls the driving device 5, the brake device 6, and the steering device 7, and causes the vehicle 1 to travel autonomously.

The grip determining unit 41 determines whether the driver is gripping the steering wheel 22 based on the capacitance of the contact sensor 35 and the output value (output voltage) of the steering torque sensor 32. Details of the determination method thereof will be described later.

In the following, for convenience of explanation, the functional components of the controller 15 will be simply referred to as "the controller 15" without distinction.

<The Configuration of the Steering Wheel 22>

Figure 2:
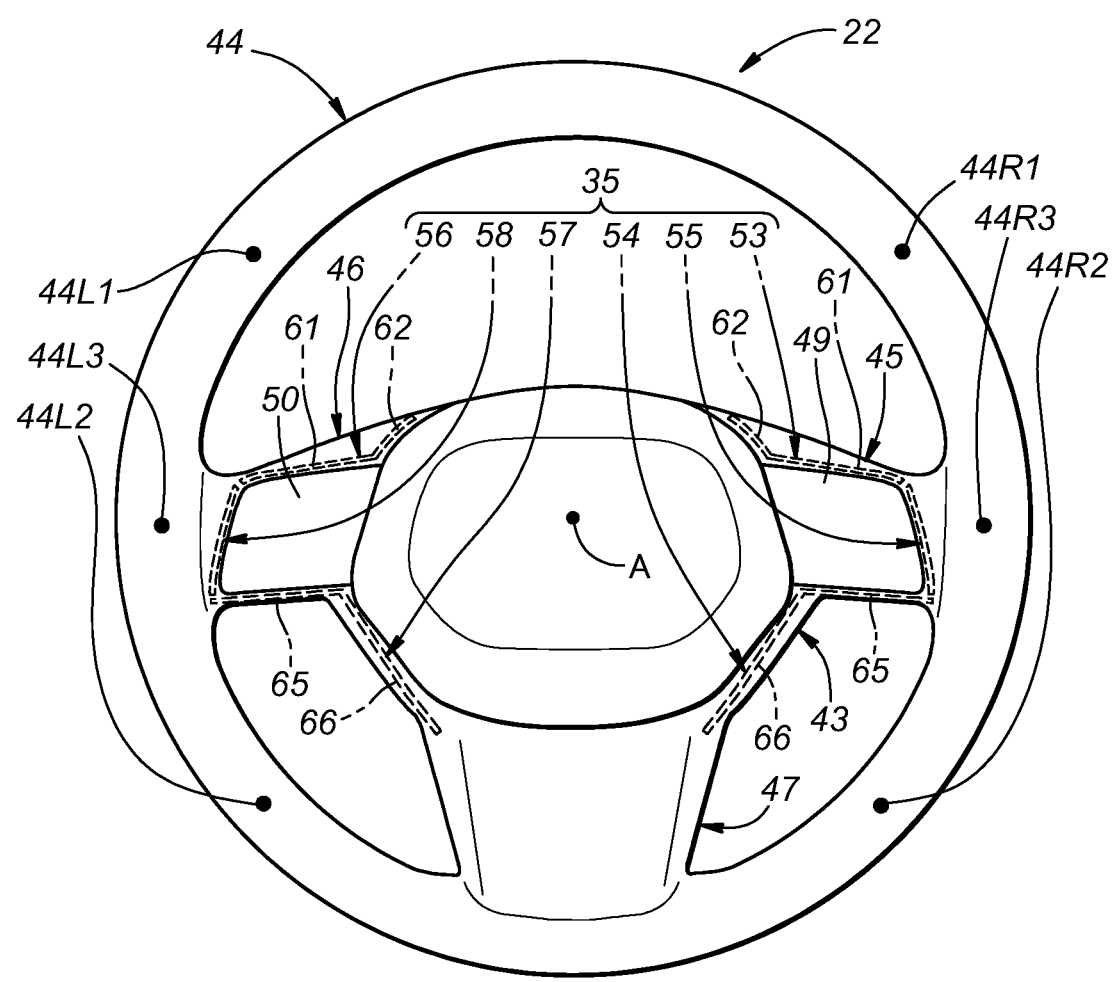
FIG. 2 is a front view showing a steering wheel according to the first embodiment of the present invention.

Next, the configuration of the steering wheel 22 will be described with reference to FIG. 2. Hereinafter, the simple phrase "the radial direction" refers to the radial direction of the steering wheel 22, and the simple phrase "the circumferential direction" refers to the circumferential direction of the steering wheel 22.

The steering wheel 22 includes a cylindrical hub 43 provided on a rotation axis A of the steering wheel 22, an annular rim 44 provided outside the hub 43 with respect to the radial direction, and a plurality of spokes 45 to 47 extending in the radial direction and connecting the hub 43 and the rim 44.

The hub 43 is rotatably connected to a steering shaft (not shown) connected to the steering device 7. Thus, the steering wheel 22 is rotatably supported by the steering shaft.

The rim 44 is spaced away from the hub 43 with respect to the radial direction. In another embodiment, the plurality of spokes 45 to 47 may be omitted, and the rim 44 may be directly connected to the hub 43.

The plurality of spokes 45 to 47 is spaced away from each other with respect to the circumferential direction. The plurality of spokes 45 to 47 includes a right spoke 45 extending rightward from the hub 43, a left spoke 46 extending leftward from the hub 43, and a lower spoke 47 extending downward from the hub 43. A rectangular right switch unit 49 is provided on a rear surface (a surface on the driver's side) of the right spoke 45. For example, the right switch unit 49 includes a switch for starting/ending the driving assistance control, a switch for changing the state of the driving assistance control (for example, a set vehicle speed in ACC), and the like. A rectangular left switch unit 50 is provided on a rear surface (a surface on the driver's side) of the left spoke 46. For example, the left switch unit 50 includes a switch for operating an air conditioner (not shown), a switch for operating the navigation device 10, and the like.

<The Configuration and Action of the Contact Sensor 35>

Next, the configuration and action of the contact sensor 35 will be described with reference to FIG. 2.

The contact sensor 35 includes a first right capacitive sensor 53, a second right capacitive sensor 54, a third right capacitive sensor 55, a first left capacitive sensor 56, a second left capacitive sensor 57, and a third left capacitive sensor 58. Hereinafter, when the first right capacitive sensor 53, the second right capacitive sensor 54, the third right capacitive sensor 55, the first left capacitive sensor 56, the second left capacitive sensor 57, and the third left capacitive sensor 58 are not distinguished, they will be referred to as "capacitive sensor(s) 53 to 58".

Each capacitive sensor 53 to 58 is formed of an electrode that can be capacitively coupled to an object contacting with the steering wheel 22. As the driver's hand contacts with the steering wheel 22, the distance between the driver's hand and the electrode forming the capacitive sensor 53 to 58 becomes shorter, and thus the capacitance of the capacitive sensor 53 to 58 increases. The capacitive sensor 53 to 58 is configured such that the capacitance of the capacitive sensor 53 to 58 varies according to the contact position of the driver on the steering wheel 22.

The first right capacitive sensor 53 is arranged in the right spoke 45. The first right capacitive sensor 53 includes a first extending portion 61 extending in the lateral direction along an upper edge of the right switch unit 49, and a second extending portion 62 bent upward from a left end (an inner end in the radial direction) of the first extending portion 61 and extending along an upper outer circumference of the hub 43.

The second right capacitive sensor 54 is arranged below the first right capacitive sensor 53 and extending in the right spoke 45 and the hub 43. The second right capacitive sensor 54 includes an upper extending portion 65 extending in the lateral direction along a lower edge of the right switch unit 49, and a lower extending portion 66 bent downward from a left end (an inner end in the radial direction) of the upper extending portion 65 and extending along a lower outer circumference of the hub 43.

The third right capacitive sensor 55 is arranged in the right spoke 45. The third right capacitive sensor 55 extends along a right edge (outer edge) of the right switch unit 49.

The first left capacitive sensor 56 is arranged in the left spoke 46. The first left capacitive sensor 56, like the first right capacitive sensor 53, includes the first extending portion 61, and the second extending portion 62.

The second left capacitive sensor 57 is arranged below the first left capacitive sensor 56 and extending in the left spoke 46 and the hub 43. The second left capacitive sensor 57, like the second right capacitive sensor 54, includes an upper extending portion 65 and a lower extending portion 66.

The third left capacitive sensor 58 is arranged in the left spoke 46. The third left capacitive sensor 58 extends along a left edge (outer edge) of the left switch unit 50.

When the driver contacts with a right upper portion 44R1 and/or a left upper portion 44L1 of the rim 44, the capacitance of the first right capacitive sensor 53 and/or the first left capacitive sensor 56 increases to a reference value or more. In this case, the controller 15 estimates that the contact position of the driver on the steering wheel 22 is an upper portion of the steering wheel 22.

When the driver contacts with a right lower portion 44R2 and/or a left lower portion 44L2 of the rim 44, the capacitance of the second right capacitive sensor 54 and/or the second left capacitive sensor 57 increases to the reference value or more. In this case, the controller 15 estimates that the contact position of the driver on the steering wheel 22 is a lower portion of the steering wheel 22.

When the driver contacts with a right intermediate portion 44R3 and/or a left intermediate portion 44L3 of the rim 44, the capacitance of the third right capacitive sensor 55 and/or the third left capacitive sensor 58 increases to the reference value or more. In this case, the controller 15 estimates that the contact position of the driver on the steering wheel 22 is an up-and-down intermediate portion (hereinafter abbreviated as "intermediate portion") of the steering wheel 22.

<The Configuration and Action of the Steering Torque Sensor 32>

Figure 3:
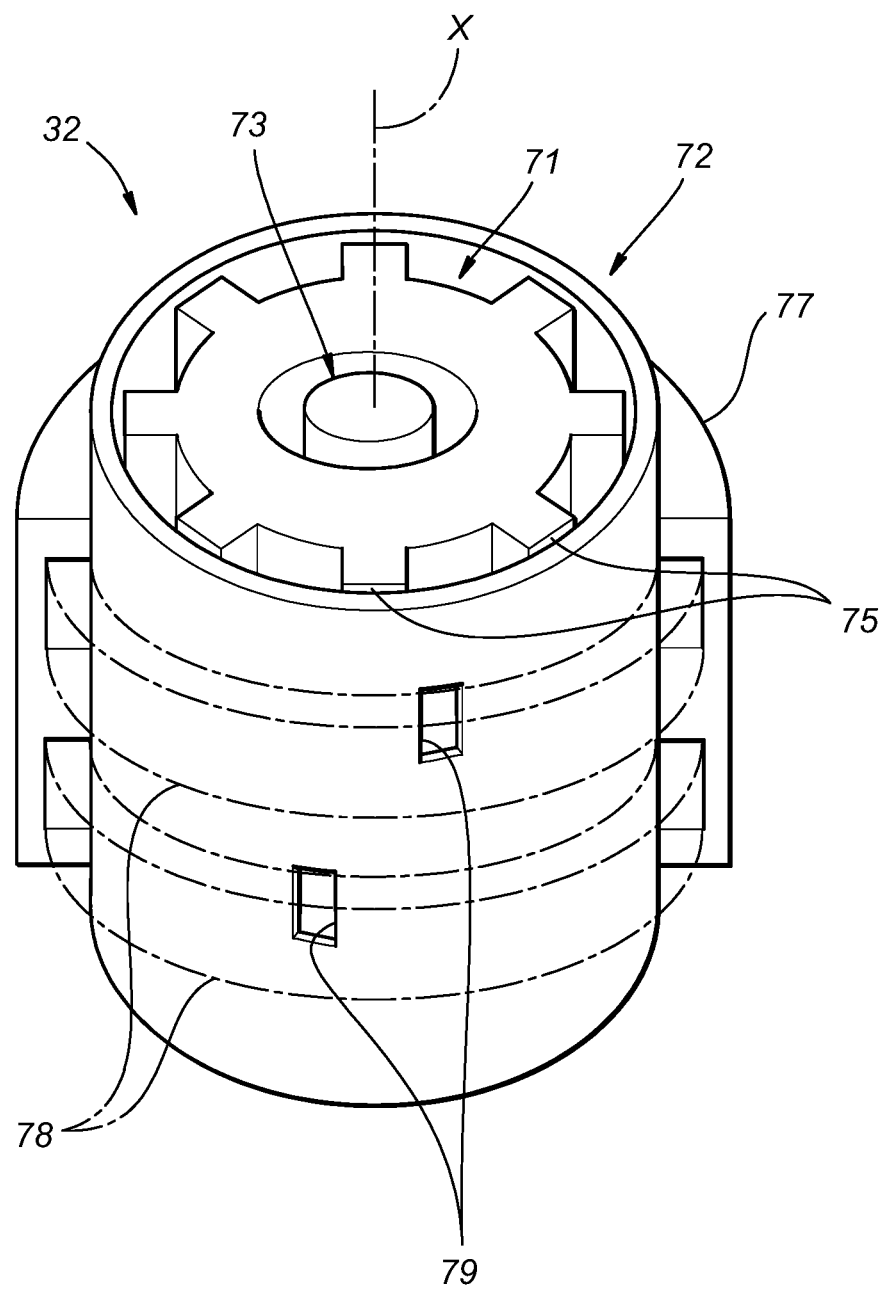
FIG. 3 is a perspective view showing a steering torque sensor according to the first embodiment of the present invention.

Next, the configuration and action of the steering torque sensor 32 will be described with reference to FIGS. 3 and 4.

The steering torque sensor 32 includes a rotor 71, a sleeve 72 arranged around the rotor 71, and a torsion bar 73 connecting the rotor 71 and the sleeve 72. The torsion bar 73 is not shown in FIG. 4.

The rotor 71 is configured to rotate around a rotation axis X. Hereinafter, "axial direction" indicates the direction along the rotation axis X of the rotor 71, and "circumferential direction" indicates the circumferential direction around the rotation axis X of the rotor 71.

The rotor 71 is connected to the steering wheel 22. For example, the rotor 71 is provided on an intermediate portion of a steering shaft (not shown) that rotatably supports the steering wheel 22. The rotor 71 has a cylindrical shape extending in the axial direction. A plurality of protrusions 75 are provided on an outer circumferential surface of the rotor 71 at intervals in the circumferential direction.

The sleeve 72 is connected to the steering device 7. The sleeve 72 has a cylindrical shape extending in the axial direction. An annular coil holder 77 (only the half thereof is shown in FIG. 3) is provided around the sleeve 72. The coil holder 77 holds a plurality of coils 78 at intervals in the axial direction. A plurality of detection windows 79 is provided in the sleeve 72 at intervals in the axial direction and the circumferential direction. The positions of the plurality of detection windows 79 in the axial direction correspond to the positions of the plurality of coils 78 in the axial direction.

The torsion bar 73 is inserted into the rotor 71. An upper end (one end in the axial direction) of the torsion bar 73 is coupled to the rotor 71. A lower end (the other end in the axial direction) of the torsion bar 73 is coupled to the sleeve 72.

When the steering wheel 22 rotates according to the steering operation by the driver, the rotor 71 connected to the steering wheel 22 rotates. Accordingly, the rotation of the rotor 71 is transmitted to the sleeve 72 via the torsion bar 73, and the sleeve 72 rotates. Accordingly, the steering device 7 connected to the sleeve 72 turns the wheels 17 and changes the turning angle of the wheels 17.

As described above, when the rotation of the rotor 71 is transmitted to the sleeve 72 via the torsion bar 73, the torsion corresponding to the steering torque (the torque applied to the steering wheel 22 by the steering operation) is generated at the torsion bar 73. Accordingly, the positional relationship between the plurality of protrusions 75 of the rotor 71 and the plurality of detection windows 79 of the sleeve 72 changes, and thus the magnetic flux density of the plurality of coils 78 changes. Accordingly, the output value (output voltage) of the steering torque sensor 32 changes. As described above, the steering torque sensor 32 is configured to generate (output) the output value according to the steering torque.

Figure 4:
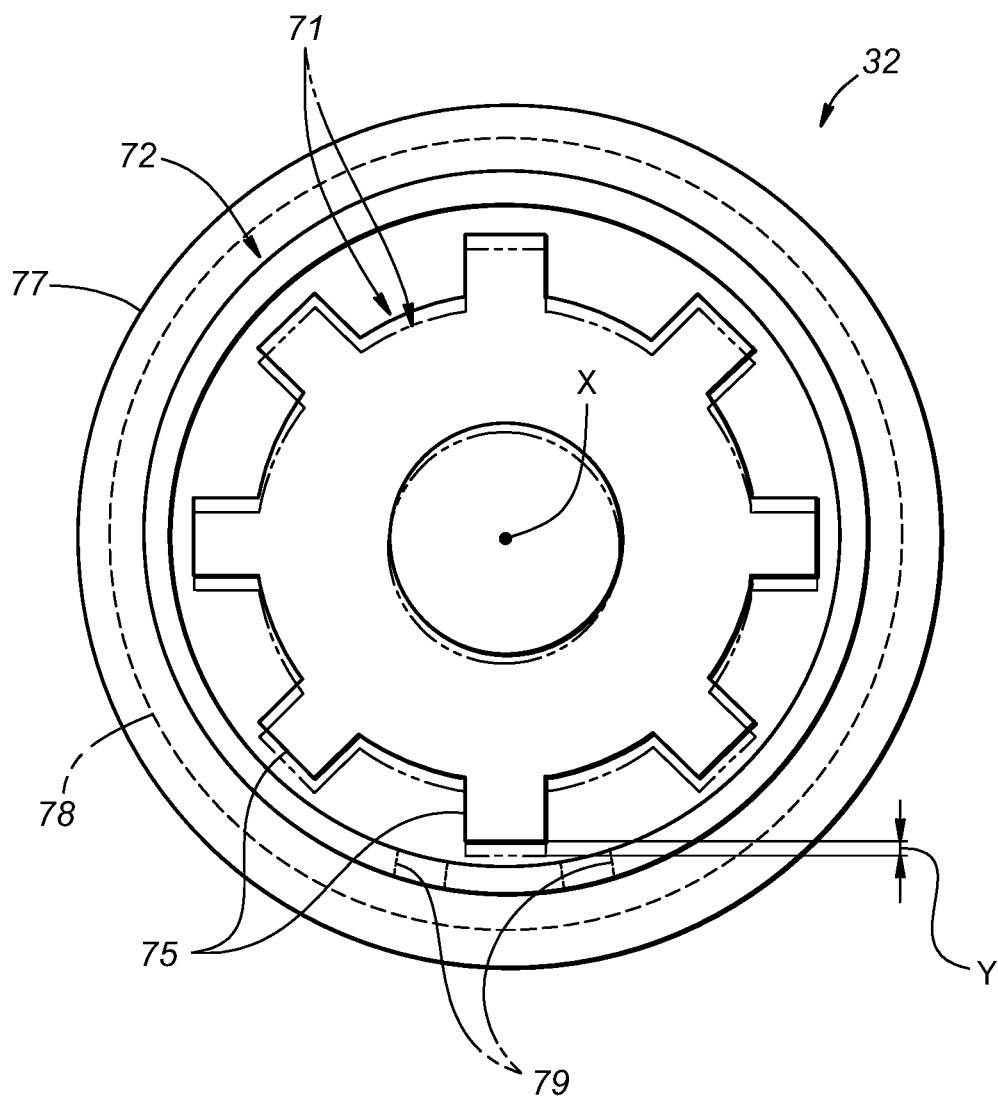
FIG. 4 is a plan view showing the steering torque sensor according to the first embodiment of the present invention.

As shown by a solid line in FIG. 4, in a state where the driver is not gripping the steering wheel 22, the center of the rotor 71 matches the center of the sleeve 72. By contrast, when the driver is gripping the steering wheel 22, a load is applied to the steering wheel 22 from the driver's arm. When this load is transmitted from the steering wheel 22 to the rotor 71, as shown by a two-dot chain line in FIG. 4, the rotor 71 is offset from the sleeve 72 in a direction perpendicular to the rotation axis X according to the direction of the load, and thus becomes eccentric to the sleeve 72. Accordingly, the positional relationship between the plurality of protrusions 75 of the rotor 71 and the plurality of detection windows 79 of the sleeve 72 changes, and the magnetic flux density of the plurality of coils 78 changes. Accordingly, even in a state where the steering torque is not generated, the output value of the steering torque sensor 32 becomes larger.

At this time, as the load applied to the steering wheel 22 from the driver's arm becomes larger, not only an offset width Y of the rotor 71 from the sleeve 72 but also the output value of the steering torque sensor 32 becomes larger. In a case where the driver is gripping the upper portion of the steering wheel 22, the driver's hand holds the steering wheel 22 from above. Accordingly, the entire load of the driver's arm is likely to be applied to the steering wheel 22. By contrast, in a case where the driver is gripping the lower portion of the steering wheel 22, the driver's hand is put on the steering wheel 22 from below with a folded state. Accordingly, the entire load of the driver's arm is unlikely to be applied to the steering wheel 22. Accordingly, in a case where the driver is gripping the upper portion of the steering wheel 22, the rotor 71 is offset more largely from the sleeve 72 in the direction perpendicular to the rotation axis X (the offset width Y of the rotor 71 from the sleeve 72 becomes larger) and thus the output value of the steering torque sensor 32 becomes larger than in a case where the driver is gripping the lower portion of the steering wheel 22.

<The Grip Determining Control>

Figure 5:
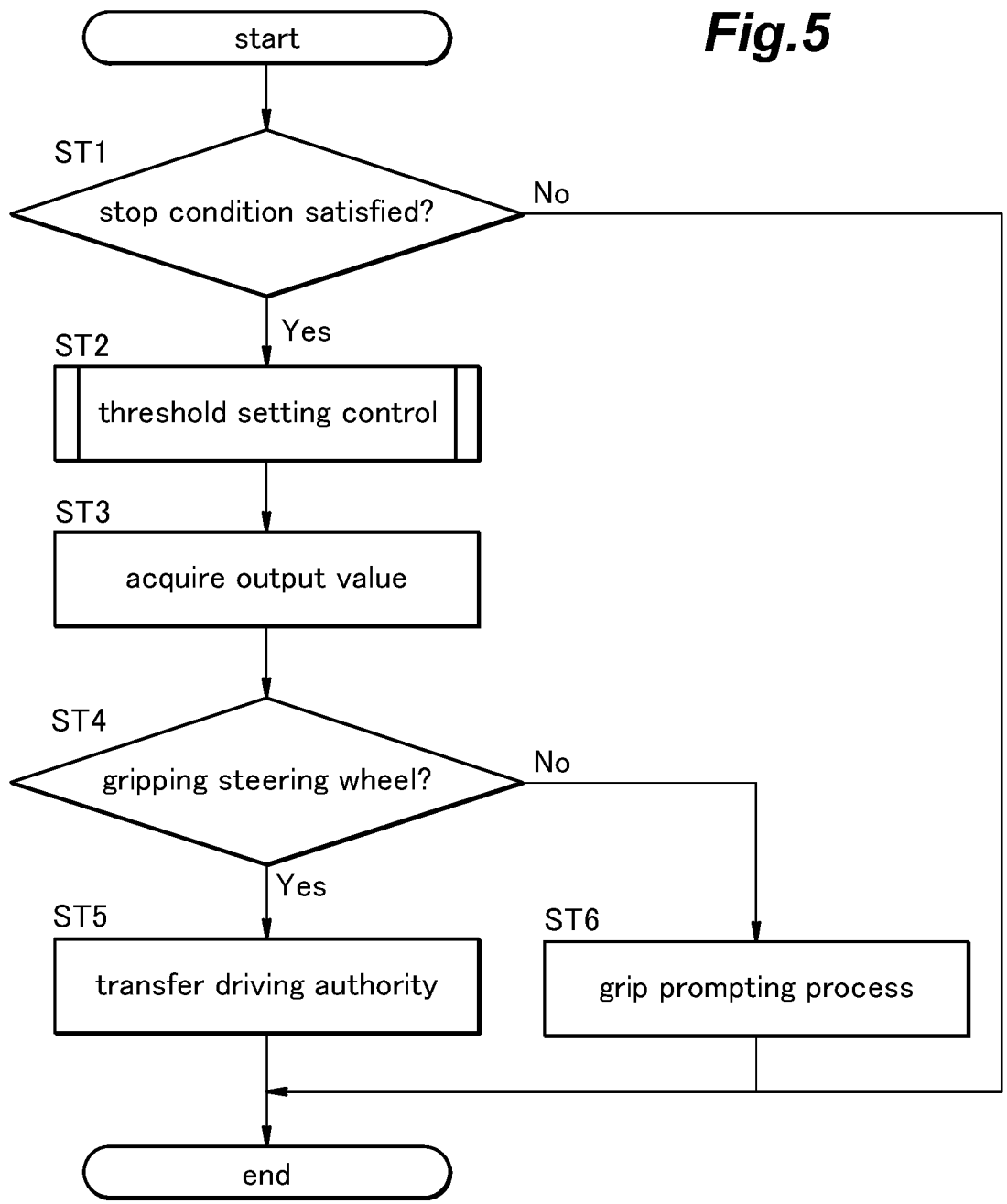
FIG. 5 is a flowchart showing grip determining control according to the first embodiment of the present invention.

Next, with reference to FIG. 5, the grip determining control for determining whether the driver is gripping the steering wheel 22 will be described. In the present embodiment, it is assumed that the controller 15 is executing the autonomous driving control when the grip determining control is started.

When the grip determining control is started, the controller 15 determines whether a stop condition for stopping the autonomous driving control is satisfied (step ST1). In other words, the controller 15 determines whether the autonomous driving level should be shifted from 3 or higher to 2 or lower. For example, the stop condition includes a condition that the driver performs a stop operation of the autonomous driving control on the HMI 8 and a condition that the autonomous driving control cannot be continued due to a failure of a sensor, or the like. In a case where the controller 15 determines that the stop condition is not satisfied (step ST1: No), the controller 15 ends the grip determining control without determining whether the driver is gripping the steering wheel 22.

In a case where the controller 15 determines that the stop condition is satisfied (step ST1: Yes), the controller 15 executes threshold setting control for setting a threshold T related to the output value of the steering torque sensor 32 (step ST2). Details of the threshold setting control will be described later.

After the controller 15 sets the threshold T in the threshold setting control (step ST2), the controller 15 acquires the output value of the steering torque sensor 32 (step ST3), and determines whether the driver is gripping the steering wheel 22 (step ST4) based on the acquired output value of the steering torque sensor 32 and the threshold T. More specifically, in a case where the output value of the steering torque sensor 32 is equal to or more than the threshold T, the controller 15 determines that the driver is gripping the steering wheel 22. By contrast, in a case where the output value of the steering torque sensor 32 is less than the threshold T, the controller 15 determines that the driver is not gripping the steering wheel 22.

In a case where the controller 15 determines that the driver is gripping the steering wheel 22 (step ST4: Yes), the controller 15 stops the autonomous driving control and transfers the driving authority of the vehicle 1 to the driver (step ST5). Accordingly, the driving entity of the vehicle 1 transfers from the controller 15 to the driver.

In a case where the controller 15 determines that the driver is not gripping the steering wheel 22 (step ST4: No), the controller 15 executes a grip prompting process (step ST6). In the grip prompting process, the controller 15 prompts the driver to grip the steering wheel 22 via the HMI 8.

<The Threshold Setting Control>

Figure 6:
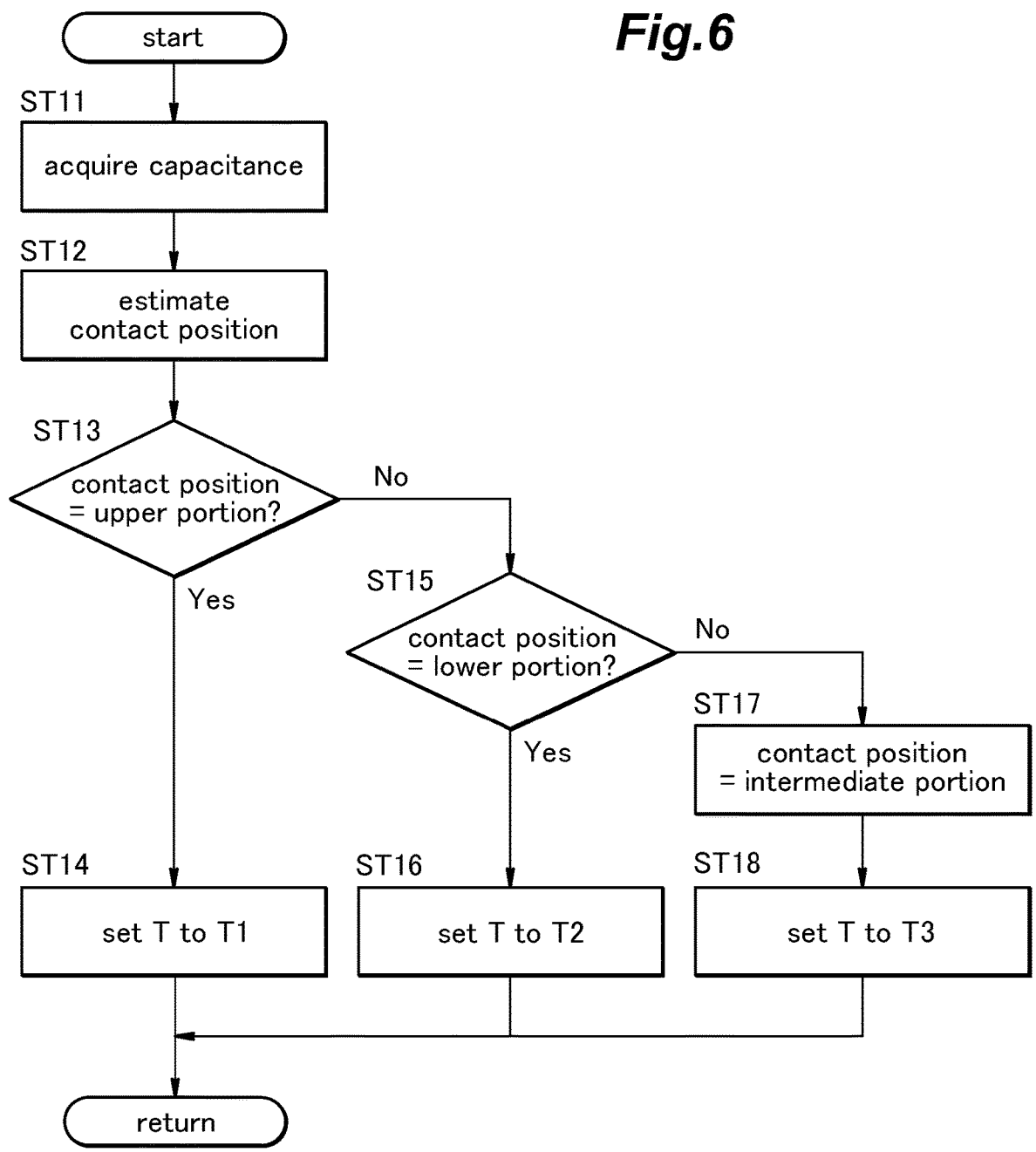
FIG. 6 is a flowchart showing threshold setting control according to the first embodiment of the present invention.
Figure 7:
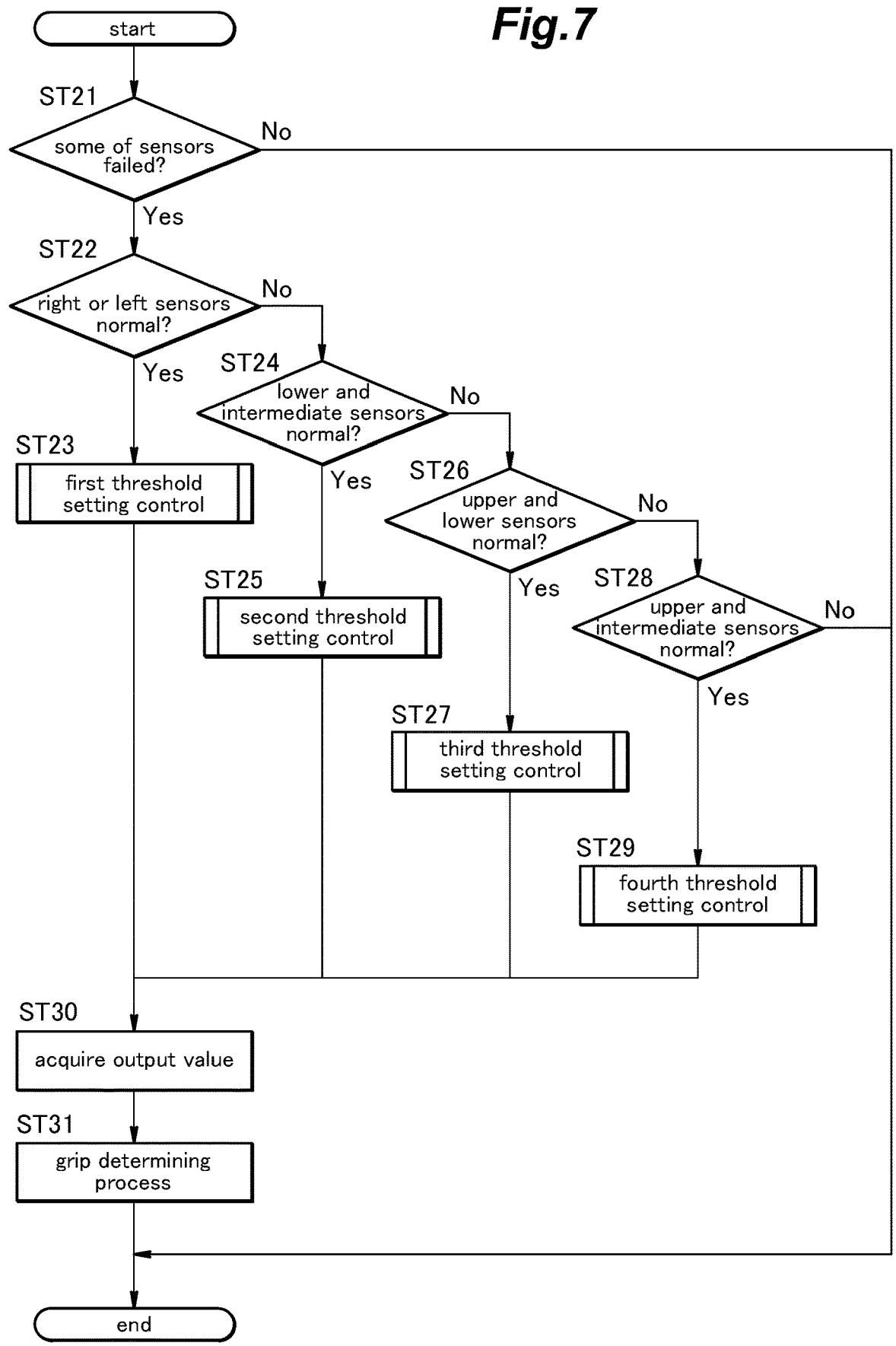
FIG. 7 is a flowchart showing grip determining control according to a second embodiment of the present invention.

Next, the above-mentioned threshold setting control (step ST2) will be described with reference to FIG. 6.

When the threshold setting control is started, the controller 15 acquires the capacitance of the capacitive sensors 53 to 58 (step ST11), and estimates the contact position of the driver on the steering wheel 22 (hereinafter simply referred to as "the contact position") (step ST12) based on the acquired capacitance.

Next, the controller 15 determines whether the contact position is the upper portion (an example of a first portion) of the steering wheel 22 (step ST13) based on the estimation result in step ST12. In a case where the controller 15 determines that the contact position is the upper portion of the steering wheel 22 (step ST13: Yes), the controller 15 sets the threshold T to a first value T1 (step ST14).

In a case where the controller 15 determines that the contact position is not the upper portion of the steering wheel 22 (step ST13: No), the controller 15 determines whether the contact position is the lower portion (an example of a second portion) of the steering wheel 22 (step ST15) based on the estimation result in step ST12. In a case where the controller 15 determines that the contact position is the lower portion of the steering wheel 22 (step ST15: Yes), the controller 15 sets the threshold T to a second value T2 (step ST16). The second value T2 is smaller than the first value T1.

In a case where the controller 15 determines that the contact position is not the lower portion of the steering wheel 22 (step ST15: No), the controller 15 estimates that the contact position is the intermediate portion (an example of a third portion) of the steering wheel 22 (step ST17), and sets the threshold T to a third value T3 (step ST18). The third value T3 is smaller than the first value T1 and larger than the second value T2.

<The Effect of the First Embodiment>

The controller 15 estimates the contact position based on the capacitance of the capacitive sensors 53 to 58, and sets the threshold T according to the estimated contact position. Thus, it is possible to set the threshold T to an appropriate value according to the contact position, and accurately determine whether the driver is gripping the steering wheel 22 accordingly.

Further, in a case where the output value of the steering torque sensor 32 is equal to or more than the threshold T, the controller 15 determines that the driver is gripping the steering wheel 22, and transfers the driving authority of the vehicle 1 to the driver. Thus, it is possible to transfer the driving authority of the vehicle 1 to the driver after accurately determining that the driver is gripping the steering wheel 22.

The Second Embodiment

Hereinafter, the second embodiment of the present invention will be described with reference to FIGS. 7 to 11. The contents other than the grip determining control executed by the controller 15 are the same as those of the first embodiment, so the description thereof will be omitted. In FIGS. 7 to 11, "capacitive sensors" are abbreviated as "sensors".

In the following, the three capacitive sensors 53 to 55 arranged in the right side portion of the steering wheel 22 will be referred to as "right capacitive sensors 53 to 55", and the three capacitive sensors 56 to 58 arranged in the left side portion of the steering wheel 22 will be referred to as "left capacitive sensors 56 to 58". Further, the two capacitive sensors 53 and 56 arranged in the upper portions of the left and right side portions of the steering wheel 22 will be referred to as "upper capacitive sensors 53 and 56", the two capacitive sensors 54 and 57 arranged in the lower portions of the left and right side portions of the steering wheel 22 will be referred to as "lower capacitive sensors 54 and 57", and the two capacitive sensors 55 and 58 arranged in the up-and-down intermediate portions of both left and right side portions of the steering wheel 22 will be referred to as "intermediate capacitive sensors 55 and 58".

<The Grip Determining Control>

When the grip determining control is started, the controller 15 determines whether some of the capacitive sensors 53 to 58 are failed (step ST21). In a case where the controller 15 determines that none of the capacitive sensors 53 to 58 are failed (step ST21: No), the controller 15 ends the grip determining control without determining whether the driver is gripping the steering wheel 22.

In a case where the controller 15 determines that some of the capacitive sensors 53 to 58 are failed (step ST21: Yes), the controller 15 determines whether either the right capacitive sensors 53 to 55 or the left capacitive sensors 56 to 58 are normal (step ST22).

In a case where the controller 15 determines that either the right capacitive sensors 53 to 55 or the left capacitive sensors 56 to 58 are normal (step ST22: Yes), the controller 15 executes first threshold setting control (step ST23). Details of the first threshold setting control will be described later.

In a case where the controller 15 determines that neither the right capacitive sensors 53 to 55 nor the left capacitive sensors 56 to 58 are normal (step ST22: No), the controller 15 determines whether both the lower capacitive sensors 54 and 57 and the intermediate capacitive sensors 55 and 58 are normal (step ST24).

In a case where the controller 15 determines that both the lower capacitive sensors 54 and 57 and the intermediate capacitive sensors 55 and 58 are normal (step ST24: Yes), the controller 15 executes second threshold setting control (step ST25). Details of the second threshold setting control will be described later.

In a case where the controller 15 determines that at least one of the lower capacitive sensors 54 and 57 or the intermediate capacitive sensors 55 and 58 is not normal (step ST24: No), the controller 15 determines whether both the upper capacitive sensors 53 and 56 and the lower capacitive sensors 54 and 57 are normal (step ST26).

In a case where the controller 15 determines that both the upper capacitive sensors 53 and 56 and the lower capacitive sensors 54 and 57 are normal (step ST26: Yes), the controller 15 executes third threshold setting control (step ST27). Details of the third threshold setting control will be described later.

In a case where the controller 15 determines that at least one of the upper capacitive sensors 53 and 56 or the lower capacitive sensors 54 and 57 is not normal (step ST26: No), the controller 15 determines whether both the upper capacitive sensors 53 and 56 and the intermediate capacitive sensors 55 and 58 are normal (step ST28).

In a case where the controller 15 determines that both the upper capacitive sensors 53 and 56 and the intermediate capacitive sensors 55 and 58 are normal (step ST28: Yes), the controller 15 executes fourth threshold setting control (step ST29). Details of the fourth threshold setting control will be described later.

In a case where the controller 15 determines that at least one of the upper capacitive sensors 53 and 56 or the intermediate capacitive sensors 55 and 58 is not normal (step ST28: No), the controller 15 ends the grip determining control without determining whether the driver is gripping the steering wheel 22.

After setting the threshold T in the first threshold setting control (step ST23), the second threshold setting control (step ST25), the third threshold setting control (step ST27), or the fourth threshold setting control (step ST29), the controller 15 acquires the output value of the steering torque sensor 32 (step ST30).

Next, the controller 15 executes a grip determining process (step ST31). In the grip determining process, the controller 15 determines whether the driver is gripping the steering wheel 22 based on the output value of the steering torque sensor 32 and the threshold T. More specifically, in a case where the output value of the steering torque sensor 32 is equal to or more than the threshold T, the controller 15 determines that the driver is gripping the steering wheel 22. By contrast, in a case where the output value of the steering torque sensor 32 is less than the threshold T, the controller 15 determines that the driver is not gripping the steering wheel 22.

<The First Threshold Setting Control>

Figure 8:
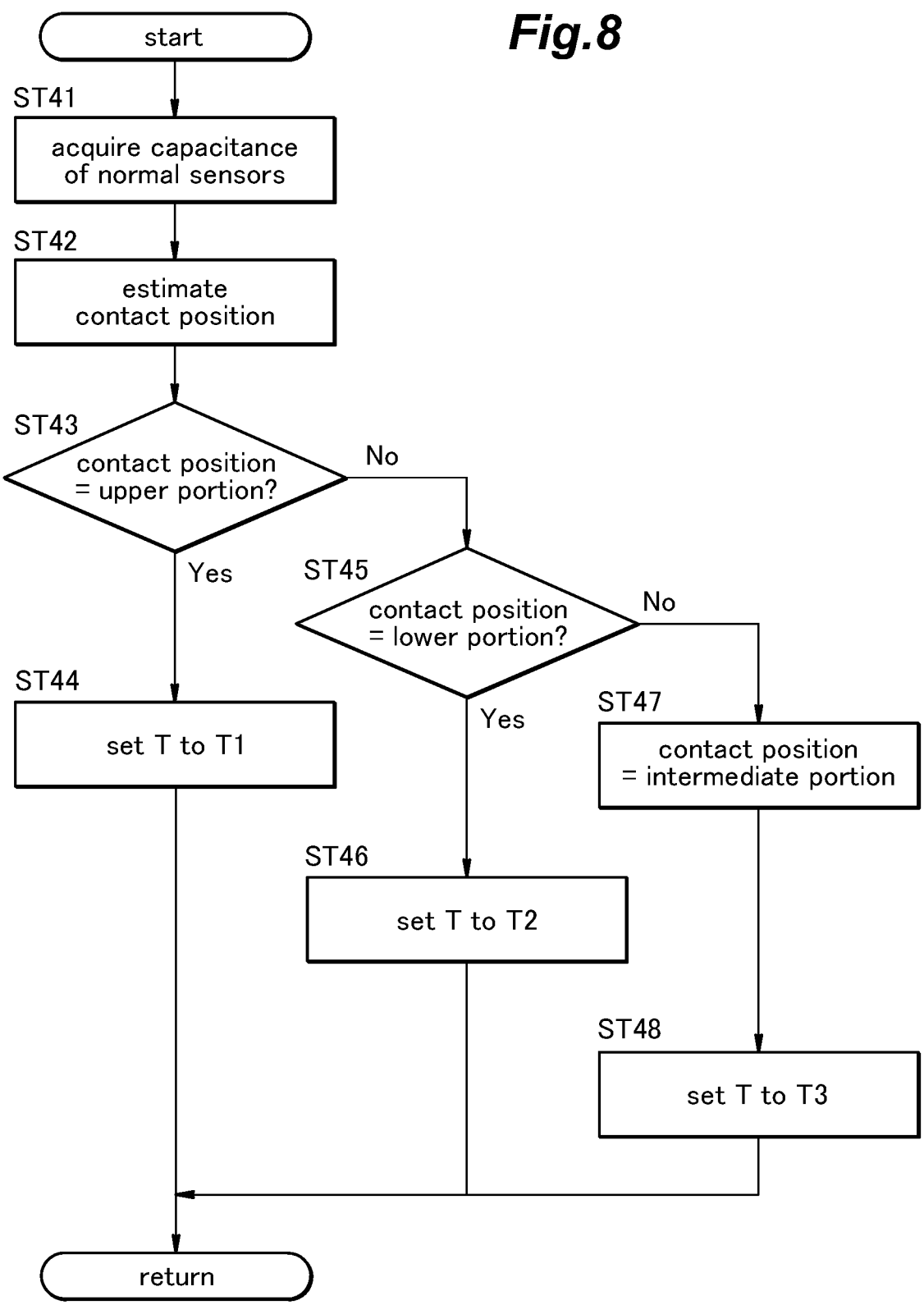
FIG. 8 is a flowchart showing first threshold setting control according to the second embodiment of the present invention.

Next, the above-mentioned first threshold setting control (step ST23) will be described with reference to FIG. 8. Steps ST43 to ST48 of the first threshold setting control are the same as steps ST13 to ST18 of the threshold setting control in the first embodiment, so the description thereof will be omitted.

When the first threshold setting control is started, the controller 15 acquires the capacitance of the normal capacitive sensors 53 to 58 (in the first threshold setting control, either the right capacitive sensors 53 to 55 or the left capacitive sensors 56 to 58) (step ST41). Next, the controller 15 estimates the contact position of the driver on the steering wheel 22 (hereinafter simply referred to as "the contact position") (step ST42) based on the capacitance of the normal capacitive sensors 53 to 58 acquired in step ST41.

<The Second Threshold Setting Control>

Figure 9:
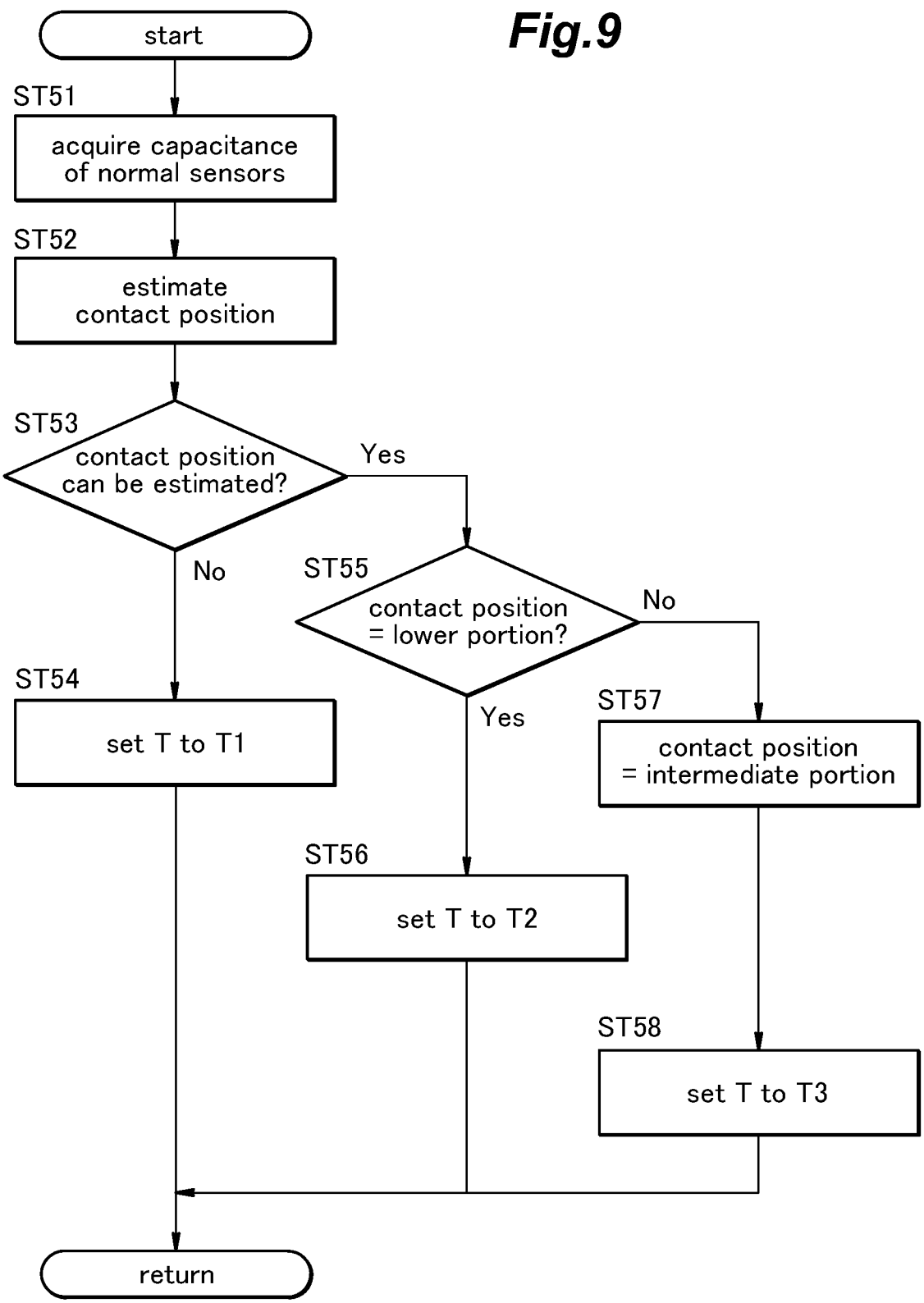
FIG. 9 is a flowchart showing second threshold setting control according to the second embodiment of the present invention.

Next, the above-mentioned second threshold setting control (step ST25) will be described with reference to FIG. 9. Steps ST55 to ST58 of the second threshold setting control are the same as steps ST15 to ST18 of the threshold setting control in the first embodiment, so the description thereof will be omitted.

When the second threshold setting control is started, the controller 15 acquires the capacitance of the normal capacitive sensors 53 to 58 (in the second threshold setting control, the lower capacitive sensors 54 and 57 and the intermediate capacitive sensors 55 and 58) (step ST51). Next, the controller 15 estimates the contact position (step ST52) based on the capacitance of the normal capacitive sensors 53 to 58 acquired in step ST51.

Next, the controller 15 determines whether the contact position can be estimated based on the capacitance of the normal capacitive sensors 53 to 58 (step ST53). In a case where the controller 15 determines that the contact position cannot be estimated based on the capacitance of the normal capacitive sensors 53 to 58 (step ST53: No), the controller 15 estimates that the contact position is the upper portion of the steering wheel 22, and sets the threshold T to the first value T1 (step ST54). In this way, the controller 15 estimates that the contact position is a portion corresponding to the failed capacitive sensors 53 to 58 (in the second threshold setting control, the upper capacitive sensors 53 and 56), and sets the threshold T according to the estimated contact position.

<The Third Threshold Setting Control>

Figure 10:
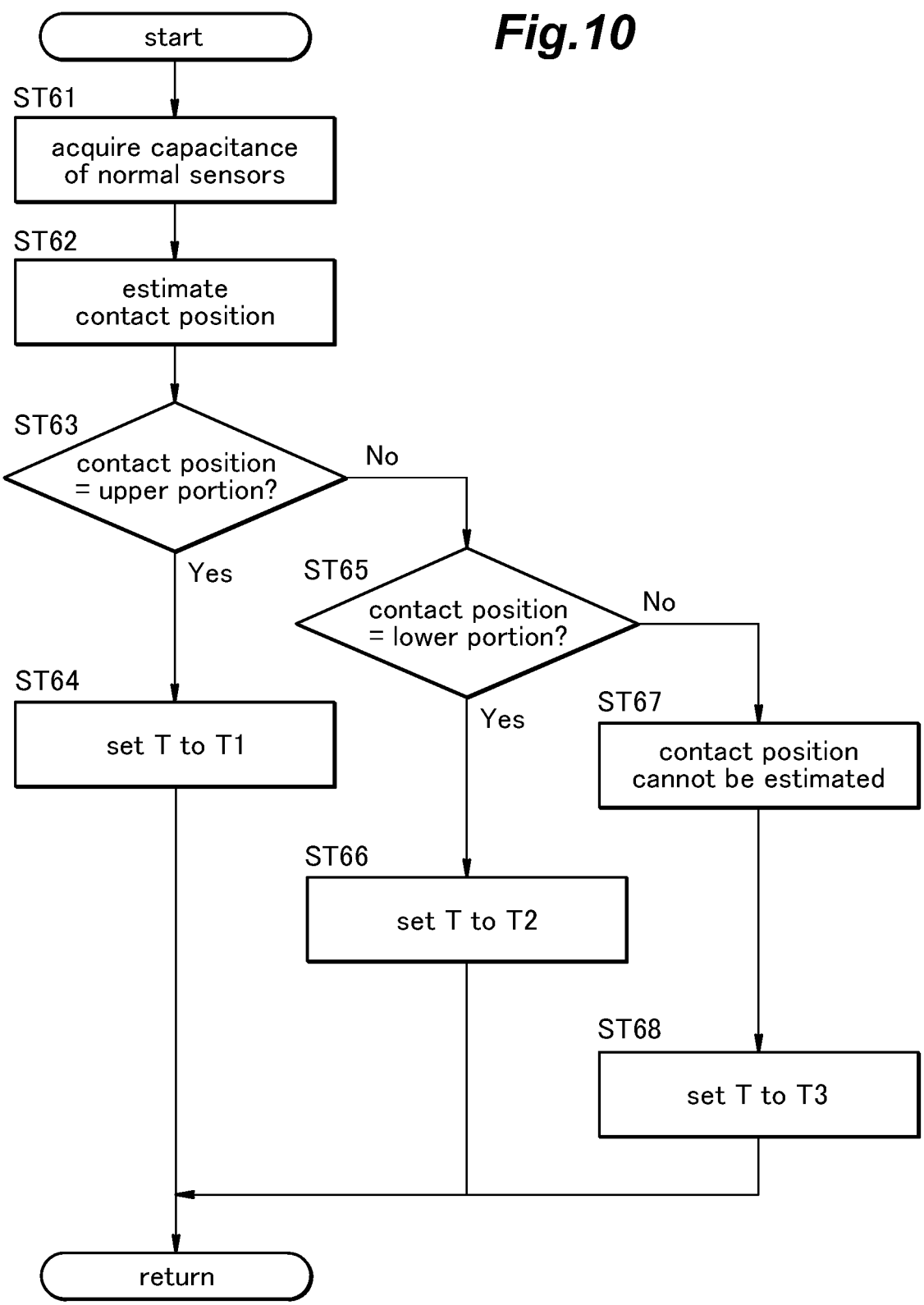
FIG. 10 is a flowchart showing third threshold setting control according to the second embodiment of the present invention.

Next, the above-mentioned third threshold setting control (step ST27) will be described with reference to FIG. 10. Steps ST63 to ST66 of the third threshold setting control are the same as steps ST13 to ST16 of the threshold setting control in the first embodiment, so the description thereof will be omitted.

When the third threshold setting control is started, the controller 15 acquires the capacitance of the normal capacitive sensors 53 to 58 (in the third threshold setting control, the upper capacitive sensors 53 and 56 and the lower capacitive sensors 54 and 57) (step ST61). Next, the controller 15 estimates the contact position (step ST62) based on the capacitance of the normal capacitive sensors 53 to 58 acquired in step ST61.

In step ST67, the controller 15 determines that the contact position cannot be estimated based on the capacitance of the normal capacitive sensors 53 to 58. In this case, the controller 15 estimates that the contact position is the intermediate portion of the steering wheel 22, and sets the threshold T to the third value T3 (step ST68). In this way, the controller 15 estimates that the contact position is a portion corresponding to the failed capacitive sensors 53 to 58 (in the third threshold setting control, the intermediate capacitive sensors 55 and 58), and sets the threshold T according to the estimated contact position.

<The Fourth Threshold Setting Control>

Figure 11:
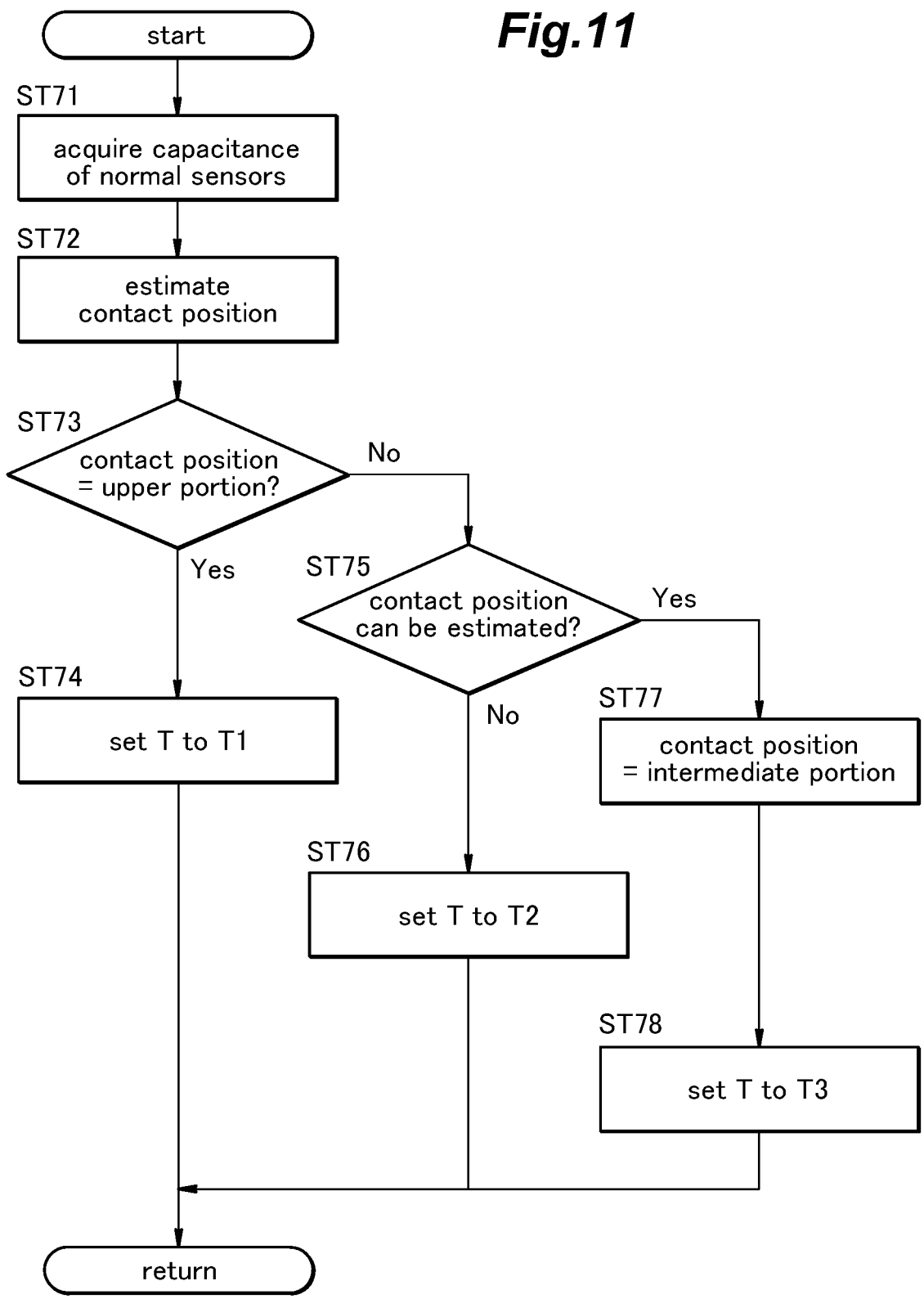
FIG. 11 is a flowchart showing fourth threshold setting control according to the second embodiment of the present invention.

Next, the above-mentioned fourth threshold setting control (step ST29) will be described with reference to FIG. 11. Steps ST73 to ST74 and ST77 to ST78 of the fourth threshold setting control are the same as steps ST13 to ST14 and ST17 to ST18 of the threshold setting control in the first embodiment, so the description thereof will be omitted.

When the fourth threshold setting control is started, the controller 15 acquires the capacitance of the normal capacitive sensors 53 to 58 (in the fourth threshold setting control, the upper capacitive sensors 53 and 56 and the intermediate capacitive sensors 55 and 58) (step ST71). Next, the controller 15 estimates the contact position (step ST72) based on the capacitance of the normal capacitive sensors 53 to 58 acquired in step ST71.

In step ST75, the controller 15 determines whether the contact position can be estimated based on the capacitance of the normal capacitive sensors 53 to 58. In a case where the controller 15 determines that the contact position cannot be estimated based on the capacitance of the normal capacitive sensors 53 to 58 (step ST75: No), the controller 15 estimates that the contact position is the lower portion of the steering wheel 22, and sets the threshold T to the second value T2 (step ST76). In this way, the controller 15 estimates that the contact position is a portion corresponding to the failed capacitive sensors 53 to 58 (in the fourth threshold setting control, the lower capacitive sensors 54 and 57), and sets the threshold T according to the estimated contact position.

<The Effect of the Second Embodiment>

In the first threshold setting control, the controller 15 estimates the contact position based on the capacitance of the normal capacitive sensors 53 to 58, and sets the threshold T according to the estimated contact position. Accordingly, even in a case where some of the capacitive sensors 53 to 58 are failed, it is possible to determine whether the driver is gripping the steering wheel 22 by using both the capacitance of the normal capacitive sensors 53 to 58 and the output value of the steering torque sensor 32.

Further, in the second to fourth threshold setting control, in a case where the controller 15 cannot estimate the contact position based on the capacitance of the normal capacitive sensors 53 to 58, the controller 15 estimates that the contact position is a portion of the steering wheel 22 corresponding to the failed capacitive sensors 53 to 58, and sets the threshold T according to the estimated contact position. Accordingly, even in a case where some of the capacitive sensors 53 to 58 are failed and the contact position of the driver on the steering wheel 22 cannot be estimated based on the capacitance of the normal capacitive sensors 53 to 58, it is possible to determine whether the driver is gripping the steering wheel 22 by using the output value of the steering torque sensor 32.

The Modified Embodiments

In the above embodiment, the upper portion of the steering wheel 22 is an example of the first portion of the steering wheel 22, and the lower portion of the steering wheel 22 is an example of the second portion of the steering wheel 22. In another embodiment in which the configuration of the steering torque sensor 32 is different from that of the present embodiment, a portion other than the upper portion of the steering wheel 22 may be the first portion of the steering wheel 22, and a portion of the steering wheel 22 other than the lower portion of the steering wheel 22 may be the second portion of the steering wheel 22.

In the above embodiment, the contact sensor 35 includes three capacitive sensors 53 to 58 in each of the right and left side portions of the steering wheel 22. In another embodiment, the contact sensor 35 may include one or two capacitive sensors, or four or more capacitive sensors in each of the right and left side portions of the steering wheel 22. For example, the first right capacitive sensor 53 and the third right capacitive sensor 55 may be integrated, and the first left capacitive sensor 56 and the third left capacitive sensor 58 may be integrated. Accordingly, the contact sensor 35 may include two capacitive sensors in each of the right and left side portions of the steering wheel 22.

In the above embodiment, the contact sensor 35 includes the capacitive sensors 53 to 58 in the hub 43, the right spoke 45, and the left spoke 46 of the steering wheel 22. In another embodiment, the contact sensor 35 may include a capacitive sensor in the rim 44 of the steering wheel 22.

In the above embodiment, the steering wheel 22 including the annular rim 44 is used as the steering operation member. In another embodiment, the operation member without the annular rim 44 (for example, a control stick) may be used as the steering operation member.

Concrete embodiments of the present invention have been described in the foregoing, but the present invention should not be limited by the foregoing embodiments and various modifications and alterations are possible within the scope of the present invention.

The invention claimed is:

1. A grip determining system, comprising:
   a contact sensor provided in a steering operation member of a vehicle and configured such that capacitance of the contact sensor varies according to a contact position of a driver on the steering operation member;
   a steering torque sensor configured to output an output value according to steering torque generated by a steering operation by the driver on the steering operation member; and
   a controller configured to determine whether the driver is gripping the steering operation member based on the capacitance of the contact sensor and the output value of the steering torque sensor,
   wherein the controller is configured to
   estimate the contact position of the driver on the steering operation member based on the capacitance of the contact sensor,
   set a threshold according to the estimated contact position of the driver, and
   determine that the driver is gripping the steering operation member in a case where the output value of the steering torque sensor is equal to or more than the threshold,
   wherein the steering torque sensor is configured such that the output value of the steering torque sensor becomes larger in a case where the driver is gripping a first portion of the steering operation member than in a case where the driver is gripping a second portion of the steering operation member, and
   the controller is configured to set the threshold to a larger value in a case where the controller estimates that the contact position of the driver on the steering operation member is the first portion of the steering operation member than in a case where the controller estimates that the contact position of the driver on the steering operation member is the second portion of the steering operation member.

2. The grip determining system according to claim 1, wherein the steering torque sensor is configured such that the output value of the steering torque sensor becomes larger in a case where the driver is gripping an upper portion as the first portion of the steering operation member than in a case where the driver is gripping a lower portion as the second portion of the steering operation member, and the controller is configured to set the threshold to a larger value in a case where the controller estimates that the contact position of the driver on the steering operation member is the upper portion of the steering operation member than in a case where the controller estimates that the contact position of the driver on the steering operation member is the lower portion of the steering operation member.

3. The grip determining system according to claim 2, wherein the vehicle includes a steering device configured to turn wheels, the steering torque sensor includes:
a rotor connected to the steering operation member and configured to rotate around a rotation axis;
a sleeve connected to the steering device and arranged around the rotor; and
a torsion bar connecting the rotor and the sleeve, and
the rotor is offset more largely from the sleeve in a direction perpendicular to the rotation axis and thus the output value of the steering torque sensor becomes larger in a case where the driver is gripping the upper portion of the steering operation member than in a case where the driver is gripping the lower portion of the steering operation member.

4. The grip determining system according to claim 1, wherein the controller is configured to
set the threshold to a first value in a case where the controller estimates that the contact position of the driver on the steering operation member is the first portion of the steering operation member,
set the threshold to a second value that is smaller than the first value in a case where the controller estimates that the contact position of the driver on the steering operation member is the second portion of the steering operation member, and
set the threshold to a third value that is smaller than the first value and larger than the second value in a case where the controller estimates that the contact position of the driver on the steering operation member is a third portion between the first portion and the second portion of the steering operation member.

5. The grip determining system according to claim 1, wherein the controller is configured to
execute autonomous driving control of the vehicle,
set the threshold according to the contact position of the driver in a case where a stop condition to stop the autonomous driving control is satisfied while the autonomous driving control is being executed, and
determine that the driver is gripping the steering operation member and transfer driving authority of the vehicle to the driver in a case where the output value of the steering torque sensor is equal to or more than the threshold.

6. The grip determining system according to claim 1, wherein the contact sensor includes a plurality of capacitive sensors, and
in a case where the plurality of capacitive sensors includes a normal capacitive sensor and a failed capacitive sensor, the controller is configured to
estimate the contact position of the driver on the steering operation member based on capacitance of the normal capacitive sensor,
set the threshold according to the estimated contact position of the driver, and
determine that the driver is gripping the steering operation member in a case where the output value of the steering torque sensor is equal to or more than the threshold.

7. The grip determining system according to claim 1, wherein the contact sensor includes a plurality of capacitive sensors, and
in a case where the plurality of capacitive sensors includes a normal capacitive sensor and a failed capacitive sensor and the controller cannot estimate the contact position of the driver on the steering operation member based on capacitance of the normal capacitive sensor, the controller is configured to
estimate that the contact position of the driver on the steering operation member is a portion of the steering operation member that corresponds to the failed capacitive sensor,
set the threshold according to the estimated contact position of the driver, and
determine that the driver is gripping the steering operation member in a case where the output value of the steering torque sensor is equal to or more than the threshold.

* * * * *